UNITED STATES PATENT OFFICE.

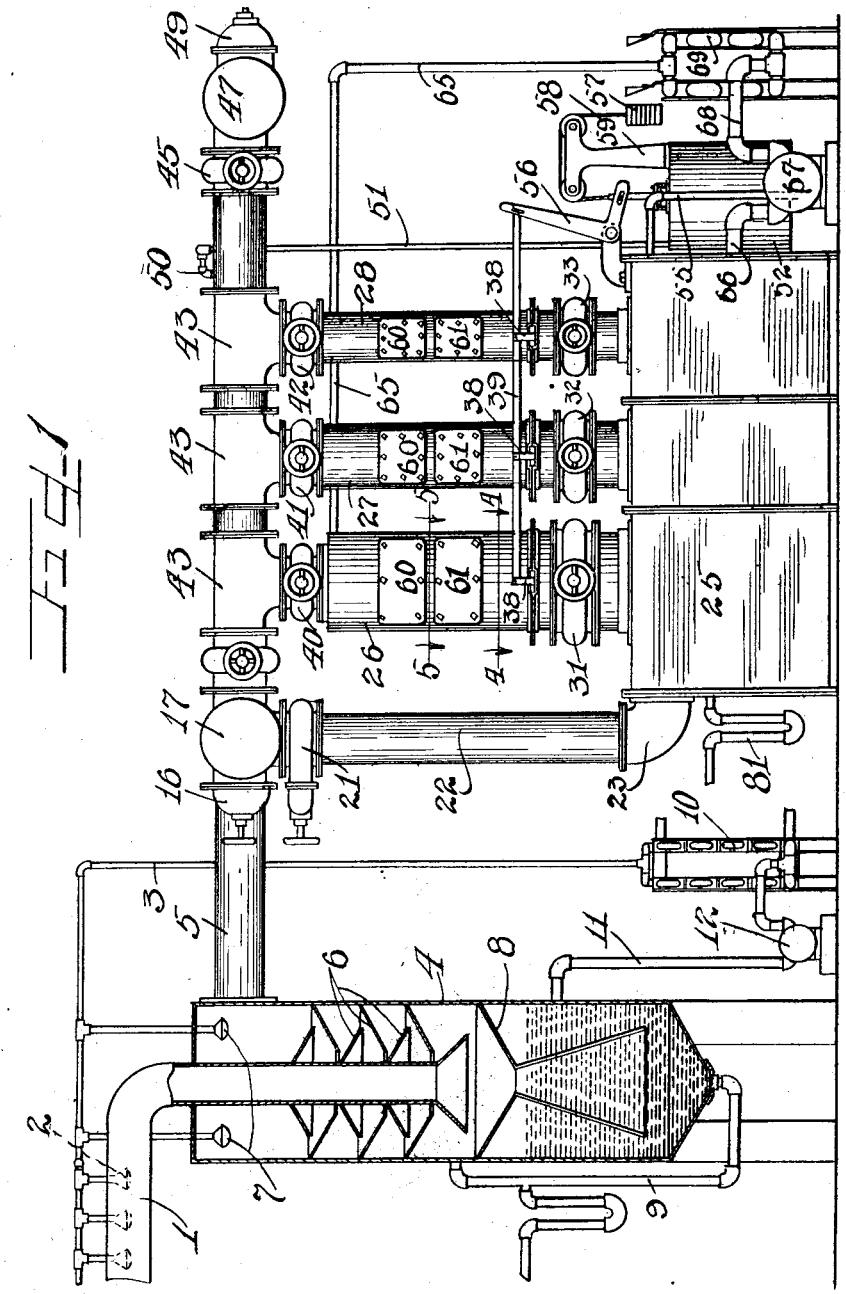

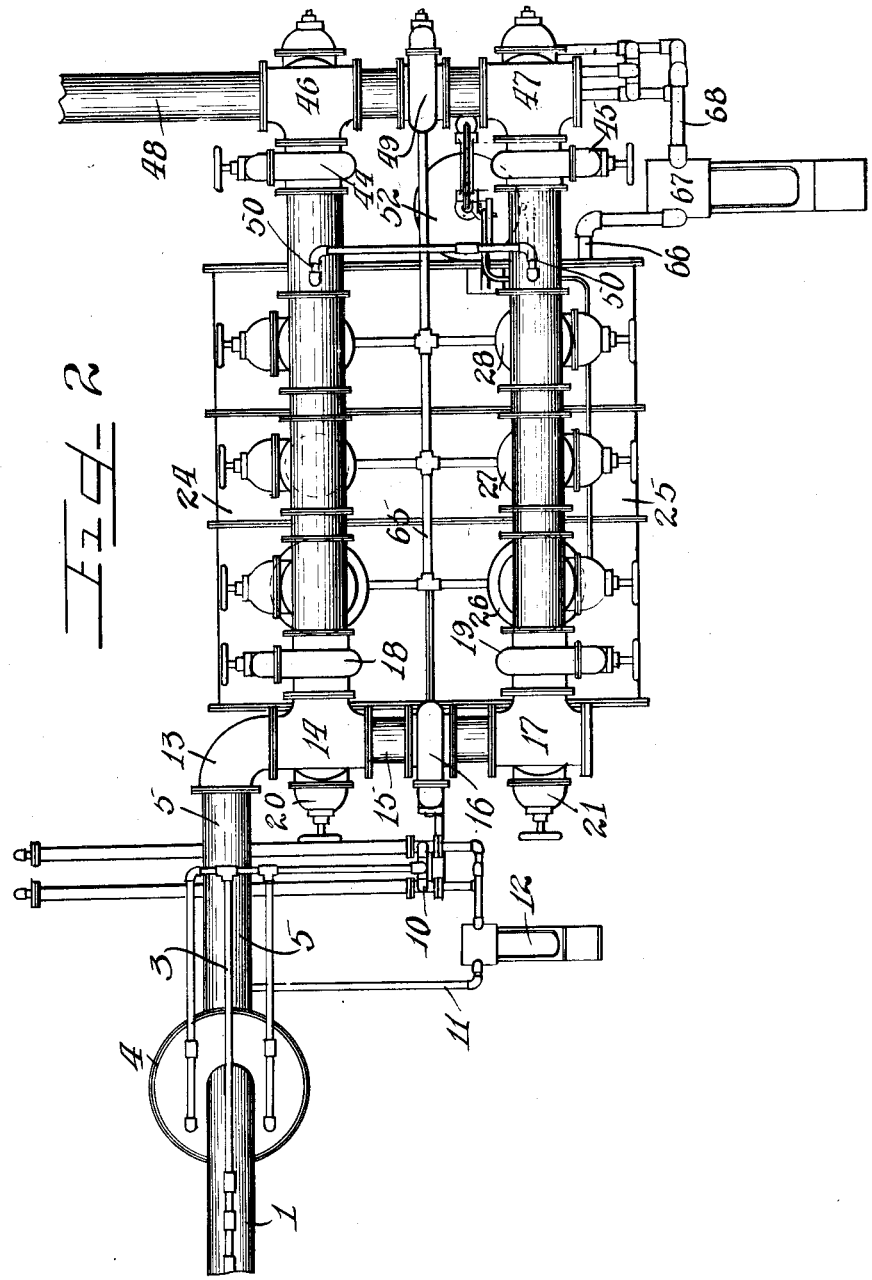

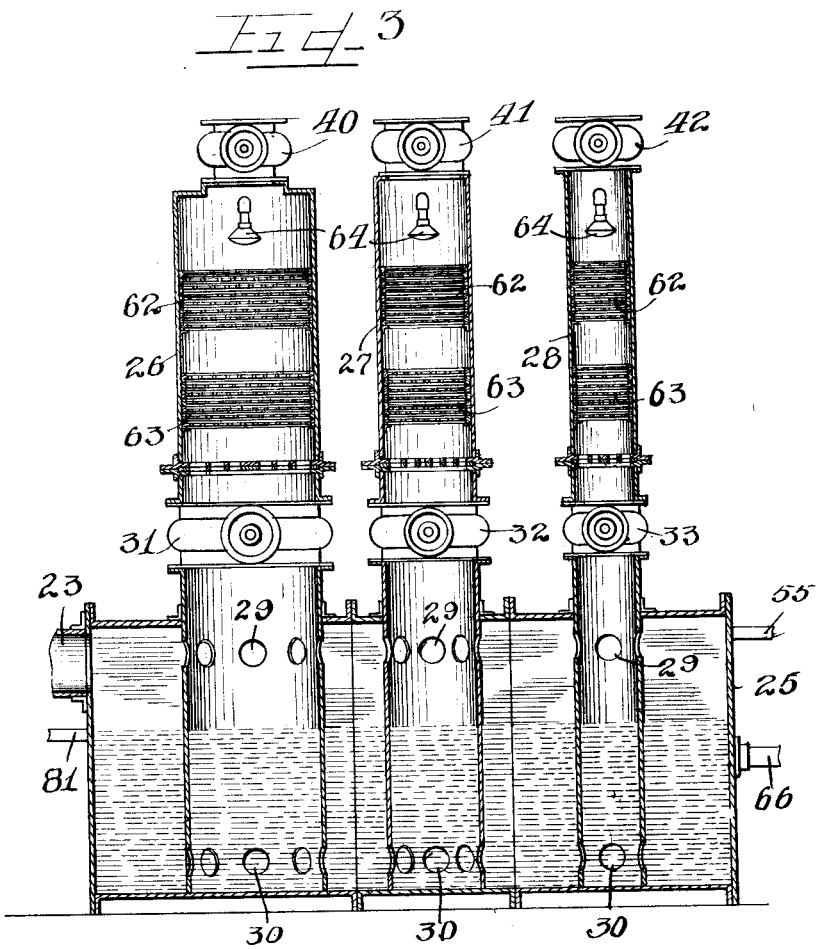

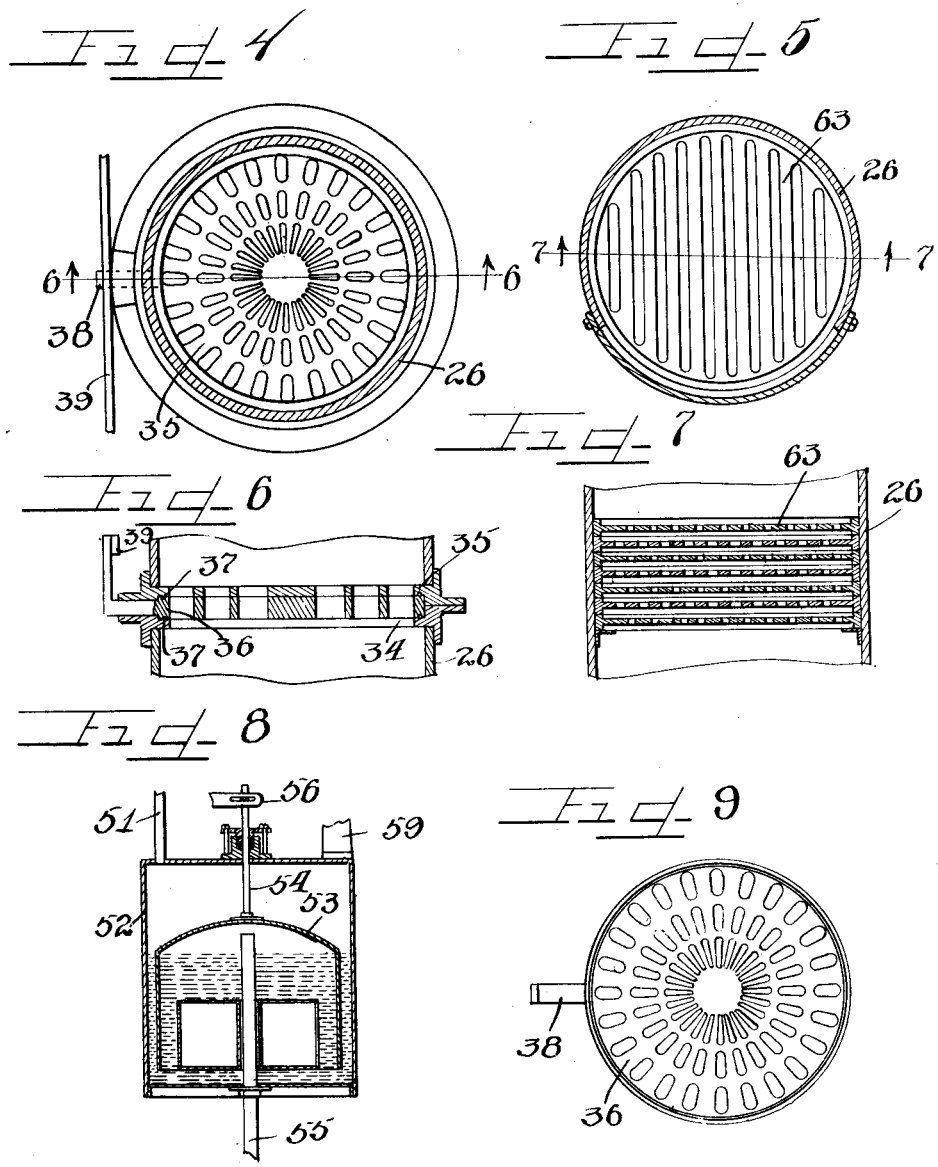

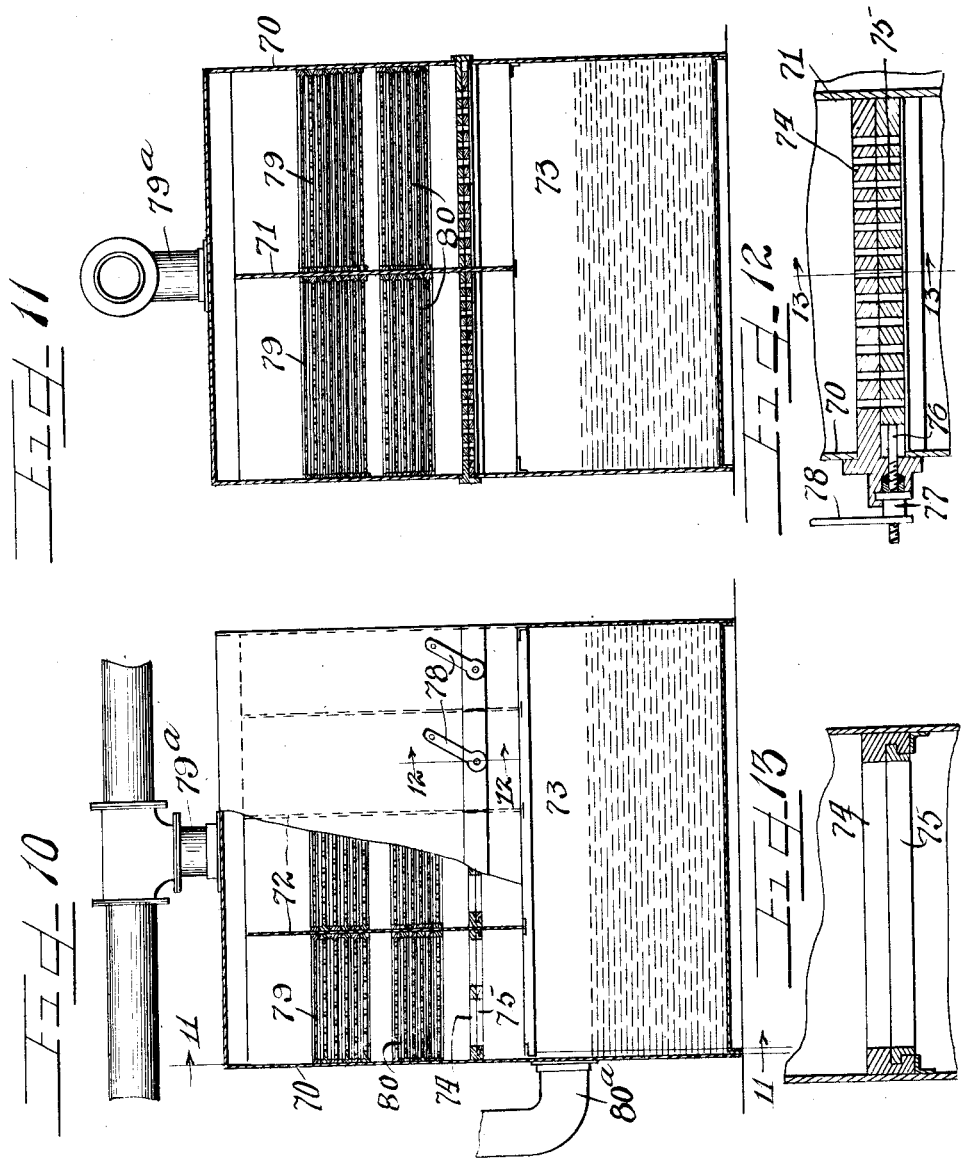

BENJAMIN M. FERGUSON, OF CHICAGO, ILLINOIS.

GAS PURIFYING, COOLING, AND BY-PRODUCT-RECOVERY APPARATUS.

1,182,544.     Specification of Letters Patent.     Patented May 9, 1916.

Application filed March 4, 1915. Serial No. 12,004.

*To all whom it may concern:*

Be it known that I, BENJAMIN M. FERGUSON, a citizen of the United States, and a resident of the city of Chicago, in the county of Cook and State of Illinois, have invented certain new and useful Improvements in Gas Purifying, Cooling, and By-Product-Recovery Apparatus; and I do hereby declare that the following is a full, clear, and exact description of the same, reference being had to the accompanying drawings, and to the numerals of reference marked thereon, which form a part of this specification.

This invention relates to that type of gas purifying systems described in my co-pending application for patent for "gas purifying apparatus," filed October 17th, 1914, Serial No. 867,053.

In the apparatus hereinafter described I employ a system of scrubbers through which the gas having been treated with the hot condensates, is caused to pass to effect a rapid precipitation of the tar, suspended matter, and other impurities from the gas, thus preparing the gas for proper treatment in subsequent apparatus and preventing the absorption of the light and heat giving hydrocarbons. I propose to employ a plurality of scrubbers of different areas of passage, having automatically controlled adjustable grid plates through which the gas passes, and thereafter subjecting the gas to the action of a counter-current of cold condensates, meanwhile the gas traversing a tortuous passage through baffle plates, and with the scrubbers interconnected with one another for simultaneous or independent operation, dependent upon the rate of generation of the gas.

It is an object therefore of this invention to construct a purifying apparatus for gas acting to effect a complete tar extraction involving the use of a system of scrubbers to permit different quantities of gas to be handled according to the generation thereof.

It is also an object of this invention to construct a system of scrubbing devices, any one or number of which may be used simultaneously and all automatically controlled.

It is furthermore an important object of this invention to construct a purifying apparatus for gas received from the hydraulic main, retorts, or ovens, which by treatment with pre-heated condensates raises the heat and vapor content of the gas and further passing the gas through a system of scrubbers rapidly precipitating the impurities therefrom.

It is finally an object of this invention to construct a system of gas purifying devices wherein means operate to effect a rapid precipitation of the impurities from the gas by passage through openings of adjustable size at high velocity and impingement upon baffle plates while subjected to the action of a counter-current of cooled condensates.

The invention (in a preferred form) is illustrated in the drawings and hereinafter more fully described.

In the drawings: Figure 1 is a complete layout of the apparatus shown in elevation with parts in section. Fig. 2 is a top plan view thereof. Fig. 3 is a fragmentary detail section taken through a battery of three scrubbers, there being two such batteries provided. Fig. 4 is a sectional view taken on line 4—4 of Fig. 1. Fig. 5 is a similar sectional view taken on line 5—5 of Fig. 1. Fig. 6 is a sectional view taken on line 6—6 of Fig. 4. Fig. 7 is a section taken on line 7—7 of Fig. 5. Fig. 8 is a central vertical section taken through the automatic pressure actuated controlling mechanism with parts shown in elevation. Fig. 9 is a plan view of one of the rotatable grid members shown detached from a scrubber. Fig. 10 is a side elevation partly broken away and shown in section, of a modified type of a battery of scrubbers. Fig. 11 is a sectional view taken on line 11—11 of Fig. 10. Fig. 12 is a fragmentary detail section taken on line 12—12 of Fig. 10. Fig. 13 is a fragmentary detail section taken on line 13—13 of Fig. 12.

As shown in the drawings, the reference numeral 1, indicates the foul pipe which leads from the hydraulic main, (not shown) containing the gas therein, which may have been partially cooled, and with the tar suspended in a finely divided state in the form of a fog or smoke. The tar has associated therewith naphthalene and other by-products which it is desirable to remove, and yet at the relatively high temperature of the gas the tar has not had the opportunity to absorb the light and heat producing hydrocarbon which it tends to take up when it cools. To prevent such cooling of the tar and absorption of the light and heat hydro-carbons, the mixture in the foul pipe is brought into intimate contact with a spray of heated liquid condensates which are at such a temperature that the vapor content of the gas is increased and furthermore the gas is prevented from cooling and throwing down the tar. For this purpose a plurality of sprayheads, designated by the reference numeral 2, are disposed in the horizontal portion of the foul pipe 1, and each communicates with a supply pipe 3. The foul pipe 1, bends downwardly and discharges into a mixing chamber 4, said foul pipe entering through the top of said chamber and terminating in an outwardly flared portion near the lower end thereof. The gas leaves the chamber 4, through an outlet pipe 5, near the top thereof, passing upwardly on its way to said outlet around a series of baffle plates 6, surrounding the foul pipe. A plurality of spray nozzles 7, connected to the supply pipe 3, in a manner similar to that of the nozzles 2, already described, are mounted in the upper end of the mixing chamber 4, and discharged thereinto, the spray meeting the ascending gas as it rises in its passage around the baffle plates. The surplus liquor introduced into the foul pipe and the mixing chamber through the respective nozzles 2 and 7, which is not taken up in the form of a vapor and carried along by the gas, settles down into the lower portion of the mixing chamber and collects in a compartment formed in the lower end thereof by a double conical baffle plate 8, with a tar overflow pipe 9, communicating into said compartment. As the liquid condensates settle downwardly into the conical baffle plate, their velocity tends to decrease, thus giving the tar an opportunity to separate and pass out through said pipe 9. Means are provided for forcing the liquor thus collected up to the respective spraying nozzles 2 and 7, and for heating it in its passage, so that upon its introduction again into the fuel pipe and mixing chamber the liquor will be at the requisite high temperature. For this purpose a steam heated double coil heater, designated as a whole by the reference numeral 10, is connected with the lower end of the mixing chamber by means of a pipe 11, and a small pump 12, of any conventional type is connected between said heater and mixing chamber and acts to pump the liquor to the heater and upwardly through said supply pipe 3, which is connected to the heater. Of course any suitable valves may be provided in the pipes 3 and 11, for controlling the flow of the condensates to and from the heater, and also for controlling the amount of steam introduced thereby regulating the temperature to which the condensates are heated. In the process thus far described the temperature of the gas has been maintained at such a degree as to prevent the particles of tar from being precipitated, and furthermore, the particles of tar and suspended matter are each enveloped with a layer of liquor, which prevents the tar from absorbing the valuable gaseous elements of the gas. The next step in the process consists in cooling the gas and extracting the tar and other suspended matter as quickly as possible in a tar extractor or scrubber designed for the purpose, the cooling and tar extraction being performed in practically a single operation. The ducts and chambers through which the gas has been allowed to pass, up to this point, are sufficient in area to permit the gas to approach a relatively quiescent state and come to equilibrium.

The outlet pipe 5, is connected to an elbow 13, which is in turn connected to a side outlet T 14, and on the opposite side of said side outlet T 14, a pipe extension 15, is connected, having a large gate valve 16, said pipe section communicating at its other end in another side outlet T 17. Large gate valves 18 and 19, respectively, are connected to lateral branches of said respective T's 14 and 17, and as clearly shown in Figs. 1 and 2, and other large gate valves 20 and 21, respectively are connected to the downwardly directed branches of said T's 14 and 17. Downwardly directed pipes are connected to the respective valves 20 and 21, the pipe connected to the valve 20, however, being concealed behind the pipe connected to the valve 21, as shown in Fig. 1, the latter pipe being denoted by the reference numeral 22. Said downwardly directed pipes at their lower ends are each connected to elbows, of which that connected to the pipe 22, is denoted by the reference numeral 23, and each of said elbows communicates in a built-up tank, the one denoted by the reference numeral 24, and the other into which said elbow 23, is connected denoted by the reference numeral 25. Said tanks 24 and 25, are duplicates in construction, and mounted on each and communicating with the interior thereof are duplicate sets or batteries of scrubbers, a set of three being provided for each tank, although more or less may be provided if so desired. Inasmuch as the construction and operation of the respective sets or batteries of scrubbers is identical, a description of one thereof is sufficient, and like numerals are applied to corresponding parts of both sets. The scrubbers mounted upon said tanks, as clearly shown in Figs. 1 and 3, vary in size, although all are of the same height, and may if desired of course be of the same size, however, the largest comprising a vertical tank 26, the next in size being similarly constructed and denoted by the reference numeral 27, and the third or smallest denoted by the reference numeral 28. As clearly shown in sectional view in Fig. 3, said tanks 26, 27, and 28, extend through the top wall of the tank 25, downwardly to the bottom thereof, and are provided with openings 29 and 30, the openings 29, being disposed above the level of the liquor in the tank 25, and the openings 30, below the level thereof. Each of said scrubber tanks is provided with a large gate valve directly above the top wall of the tank 25, the valves being denoted respectively by the reference numerals 31, 32, and 33. Disposed above each of said respective gate valves in the scrubber tanks 26, 27, and 28, are adjustable grid plates, the details of which are illustrated in Figs. 4, 6, and 9. For this purpose a ring 34, is secured in each of said tanks, and associated therewith is a radially slotted plate 35, which, together with said ring affords a peripheral or circular guide for a circular radially slotted grid plate 36, having packing rings 37, recessed thereinto and bearing against said ring and stationary slotted plate. A rigid angle shaped arm or bracket 38, extends outwardly through an arc shaped slot or opening provided between the ring 34, and plate 35, at one side of the tank, and connected to the respective arms 38, on the exterior of the respective tanks 26, 27, and 28, is a long actuating bar 39.

Gate valves 40, 41, and 42, are connected at the upper ends of each of the respective scrubber tanks 26, 27, and 28, and connected to the gate valves are T's which, together with short pipe sections connected thereto, afford an outlet main 43, for the gases from the scrubber tanks. Of course, inasmuch as the batteries of scrubber tanks are in duplicate two such outlet mains are provided, and each thereof is provided at its discharge end with a gate valve which is denoted respectively by the reference numerals 44 and 45, said gate valves being connected into T's 46 and 47, of an outlet main 48. Another gate valve 49, is provided in said outlet main 48, intermediate the T's 46 and 47. Small pipes 50, communicate through the upper walls of the respective outlet mains 43, and are each connected with a downwardly extending pipe 51, which leads to an automatic mechanism for controlling the grid plates in certain of the scrubber tanks. This mechanism consists of a cylinder 52, with a bell shaped float 53, therewithin, having a stem 54, secured thereto and extending through a suitable packing gland in the top wall of the cylinder. Communicating through the bottom of said cylinder 52, and extending upwardly within the bell 53, above the level of the sealing fluid within said cylinder, is a pressure pipe 55, which communicates with the spaces within the tank 25, above the level of the liquor therein, as clearly shown in Fig. 3. Inasmuch as the pipe 51, communicating into said cylinder 52, leads into the space above the sealing fluid in said cylinder, it is obvious that said fluid in said cylinder 52, by a counterweight 57, suspended from a cable 58, trained about idler pulleys on a bracket 59, with the other end of said cables connected to the upper end of the stem 54.

As clearly shown in Fig. 1, each of the scrubber tanks is provided with removable doors on the side walls thereof, denoted by the reference numerals 60 and 61, a pair of said doors being provided on each of the tanks. Disposed within each of the scrubber tanks opposite the respective doors 60 and 61, are groups of baffle plates, denoted respectively by the reference numerals 62 and 63, each group consisting of a series of plates laid one upon another with the slots in adjacent plates staggered, and the lowermost plate resting upon an angle iron ring secured on the interior of the tank. Said plates may be removed one at a time through the doors provided for the purpose in the walls of the tank. At the upper end of each of the scrubber tanks a sprayhead 64, is provided, which as clearly shown in Fig. 2, is connected to a suitable supply pipe 65.

Communicating in the respective tanks 24 and 25, below the level of the liquor therein, are pipes 66, which lead to a suitable pump 67, the outlet pipe 68, from which is connected to a coil cooler 69, and the aforesaid supply pipe 65, for the spray nozzles 64, communicates in the upper end of said cooler 69, to receive the cold liquor therefrom.

In the modification of my invention illustrated in Figs. 10 to 13 inclusive, I have shown the respective batteries of scrubbers mounted in a unitary rectangular shaped tank 70, having a central longitudinal vertical partition 71, extending therethrough with transverse partitions 72, extending between said main partition and the side walls of the tank, dividing the tank into compartments of different cross sectional area. A single large compartment 73, is provided in said tank 70, beneath the respective smaller compartments therein and communicates with each thereof through adjustable grids comprising a stationary slotted plate 74, and a slidable slotted plate 75. For the purpose of sliding the plate 75, a threaded shaft 76, is rigidly associated therewith which is engaged with an interiorly threaded collar or nut 77, mounted on the exterior of the tank and provided with an actuating arm 78, so that rotation of said collar or nut threads said shaft 76, inwardly or outwardly to move the plate 75. As before described, a series of slotted baffle plates with staggered apertures therethrough are provided in each of the compartments formed within the main tank 70, said groups being denoted respectively by the reference numerals 79 and 80, the one disposed above the other in each of the compartments. The partitions 71 and 72, within said tank 70, do not extend entirely to the top wall thereof, so that only one outlet is necessary and the pipe provided for the purpose is denoted by the reference numeral 79ª. An inlet 80ª, communicates into said tank 70, near the lower portion thereof, as clearly shown in Fig. 10.

The operation is as follows: The gases generated in the retorts are passed to the apparatus for purification by means of a foul pipe 1, and are introduced into a mixing chamber 4, subjected to the spray of heated condensates, which prevent a premature cooling of the gas and increase the vapor content thereof, preventing throwing down of the tar and other suspended matter. After passage through the mixing chamber, the gas leaves by the outlet pipe 5, and the large gate valves 18 and 19, being closed, passes downwardly through the open gate valves 20 and 21, to the tanks 24 and 25. The gas after its entrance into the tanks 24 and 25, passes upwardly through the scrubbing or cooling tanks, and is thereby rapidly cooled and the impurities precipitated therefrom. The gas passing through the scrubber tanks is caused to flow tortuously therethrough in fine streams at high velocity, and the cold condensing liquor is introduced at the top of said tanks through sprayheads provided for the purpose. The velocity of flow of the gas through the scrubber tanks is controlled by the adjustment of the grid plates 35 and 36. The velocity of flow of the gas through the scrubber tanks determines the difference in pressure between the inlets and outlets thereof, the grid and baffle plates of course effecting a resistance to the flow of the gases through the tanks. The automatic controlling means for actuating certain of the grid plates is extremely sensitive to the difference in pressure existent between the inlets and outlets of the scrubber tanks. This means consists of the cylinder 52, with the bell float 53, mounted therein having one pipe 51, leading into the cylinder and communicating in the outlet mains 43, and with another pipe 55, communicating into the cylinder on the interior of the bell float and connected with the interior of the tank 24.

It is obvious that any one or number of the scrubber tanks may be used, and if it is desired to cut one or more out of operation, the gate valves at the entrance and exit ends thereof may be closed for the purpose. The number of scrubber tanks maintained in operation is dependent largely upon the quantity of gas generated. Outlet pipes for the liquor in the tanks 24 and 25, are provided, being constructed to form a U-seal, as indicated by the reference numeral 81.

The purpose of utilizing a plurality of tanks of different size is to permit different quantities of gas to be handled and yet where so desired, to maintain a constant velocity therethrough. In effecting a throwing down of the tar particles from the gas the velocity of movement of the gas through the scrubber is an important factor for consideration. Obviously, with scrubbers of larger area for the same quantity of gas as compared to a scrubber of smaller area, the velocities would differ. However, it is to be clearly understood that a complete scrubbing effect takes place in each tank independently of the others, except as to the control of the volume of gas passed therethrough, and in no instance is the gas caused to retrace its path through more than one of the above described stages of the apparatus.

In the modification of my invention illustrated in Figs. 10 to 13 inclusive, the construction is slightly different in that the common supply tank for a plurality of scrubber compartments is provided, although any one of said scrubber compartments may be cut out of operation by closing the grid plates at the lower end thereof. The gases which pass through the respective scrubber compartments, different ones of which are of different cross sectional area, as clearly shown in Fig. 10, leave at the top of said compartments and again mingle with one another and flow through a common outlet 79ª.

I am aware that various details of construction may be varied through a wide range without departing from the principles of this invention, and I therefore do not purpose limiting the patent granted otherwise than necessitated by the prior art.

I claim as my invention:

1. In a device of the class described the combination with means for heating condensates for treatment of a gas, of a battery of scrubber tanks for subsequently cooling and precipitating impurities from the gas by a spray of cold condensates, and automatically controlled mechanism for governing the flow of the gases through the scrubber tanks.

2. In a device of the class described a battery of tanks of different area of cross section, baffle plates in each thereof, adjustable grid plates in said tanks for varying the rate of flow of fluid therethrough, and automatically controlled mechanism for actuating said grid plates to open and close the same to permit a predetermined flow through the tanks.

3. In a device of the class described a plurality of tanks, a common supply tank upon which the same are mounted, valves on said tanks to cut the same out of operation, adjustable grid plates, and means acting automatically to control said grid plates to vary the flow through said tanks.

4. In a gas cooling and purifying device a plurality of tanks of different cross sectional area, adjustable grids in each of said tanks, a common supply tank for said tanks, an outlet main for said tanks, automatic means communicating with said outlet main and with said supply tank to control the adjustment of said grids, and valves on each of said tanks to close off communication between any one of the same and said supply tank and outlet main.

5. In an apparatus of the class described a plurality of scrubber tanks, adjustable grids in each thereof, unitary automatically acting mechanism to adjust the grids in all said tanks simultaneously, and common supply and outlet means for said tanks.

6. In an apparatus of the class described a plurality of tanks of different size, a common supply tank on which said tanks are mounted, a common outlet main connected with all of said tanks, baffles arranged in each tank, means introducing a spray of cold liquor into each of said tanks, and automatic mechanism for controlling the flow through all of said tanks.

7. In an apparatus of the class described an interconnected system of scrubber tanks, a common supply means for introducing a spray of liquor into all of said tanks, mechanism cutting any one of said tanks out of operation, and automatically operated controlling devices in each of said tanks to govern the flow therethrough.

8. In an apparatus of the class described a main liquor supply tank into which gases pass for purification, a plurality of scrubber tanks mounted on said supply tank and extending downwardly thereinto and having openings above and below the level of the liquor in said main tank, means in said scrubber tanks forming a tortuous passage for the gases flowing therethrough from said main tank, and automatically controlled operating devices to govern the flow through said respective scrubber tanks.

9. In an apparatus of the class described a main liquor supply tank into which gases pass for purification, a plurality of scrubber tanks mounted on said supply tank and extending downwardly thereinto and having openings above and below the level of the liquor in said main tank, and means in said scrubber tanks forming a tortuous passage for the gases flowing therethrough from said main tank.

10. In a device of the class described means for treating the gas from the retorts with a spray of condensates, means heating said condensates above the temperature of the gas prior to spraying the gas, scrubbing mechanisms through which the treated gas is passed, means spraying the gas with liquor within said mechanisms, and a cooling device through which said liquor is passed for cooling the liquor which is sprayed into the scrubbing mechanisms.

11. In a device of the class described the combination with heating means and means for treating gas with heated condensates, of a battery of scrubber tanks for cooling and precipitating impurities from the gas by a spray of liquor, and a cooler adapted to receive liquor from the scrubber tanks and after cooling the same, passing said liquor back into the scrubber tanks.

12. In an apparatus of the class described a mixing chamber, a heater, connections between said heater and said mixing chamber, means to spray hot liquor into said mixing chamber as the gas from the retorts is passed thereinto, scrubbing devices to receive the treated gas from said mixing chamber, and a cooler receiving liquor from said devices lowering the temperature thereof for introduction of the same back into the scrubber devices to condense and precipitate the impurities from the gas passed into said scrubber devices.

13. In an apparatus of the class described the combination with a mixing tank and a scrubber tank, of a heater and a cooler, the heater connected to introduce hot liquor into the mixing tank and the cooler connected to introduce cold liquor into the scrubber tank.

14. In an apparatus of the class described a plurality of tanks of different size, a common supply tank on which said tanks are mounted, a common outlet means connected with all of said tanks, baffles arranged in each tank, means introducing a spray of liquor into each of said tanks, mechanisms for cooling the liquor prior to introduction through said means into the tanks, and automatic mechanism for controlling the flow through all of said tanks.

15. In an apparatus of the class described an interconnected system of scrubber tanks, a cooler for introducing cold liquor into all of said tanks, mechanism for cutting any one of said tanks out of operation, and automatically operating controlling devices to govern the flow of gas through said tanks.

16. In an apparatus of the class described the combination with a mixing tank and a scrubber tank, of a heater and a cooler, the heater connected to receive liquor from the mixing tank and means to introduce hot liquor into the mixing tank and the cooler connected to receive liquor from the scrubber tank and means to introduce cold liquor into the scrubber tank.

In testimony whereof I have hereunto subscribed my name in the presence of two subscribing witnesses.

BENJAMIN M. FERGUSON.

Witnesses:
CHARLES W. HILLS, Jr.,
FRANK K. HUDSON.

Copies of this patent may be obtained for five cents each, by addressing the "Commissioner of Patents, Washington, D. C."